(12) United States Patent
Ha et al.

(10) Patent No.: US 12,114,167 B2
(45) Date of Patent: Oct. 8, 2024

(54) METHOD AND APPARATUS FOR USING MULTIPLE IDENTIFICATION DEVICES FOR MOVING OBJECT

(71) Applicants: HYUNDAI MOTOR COMPANY, Seoul (KR); KIA CORPORATION, Seoul (KR)

(72) Inventors: Jae Jun Ha, Hwaseong-si (KR); Young Jun Moon, Sejong-si (KR)

(73) Assignees: HYUNDAI MOTOR COMPANY, Seoul (KR); KIA CORPORATION, Seoul (KR)

( * ) Notice: Subject to any disclaimer, the term of this patent is extended or adjusted under 35 U.S.C. 154(b) by 442 days.

(21) Appl. No.: 17/598,449

(22) PCT Filed: Nov. 27, 2019

(86) PCT No.: PCT/KR2019/016453
§ 371 (c)(1),
(2) Date: Sep. 27, 2021

(87) PCT Pub. No.: WO2020/209466
PCT Pub. Date: Oct. 15, 2020

(65) Prior Publication Data
US 2022/0174496 A1 Jun. 2, 2022

(30) Foreign Application Priority Data
Apr. 12, 2019 (KR) .................. 10-2019-0042877

(51) Int. Cl.
*H04W 12/45* (2021.01)
*H04W 4/40* (2018.01)
(Continued)

(52) U.S. Cl.
CPC ............. *H04W 12/45* (2021.01); *H04W 4/40* (2018.02); *H04W 12/06* (2013.01); *H04W 84/005* (2013.01); *H04W 88/06* (2013.01)

(58) Field of Classification Search
CPC ....... H04W 12/06; H04W 12/45; H04W 4/40; H04W 84/005; H04W 88/06; H04W 12/71; H04W 12/72; H04W 4/44; H04W 8/183
(Continued)

(56) References Cited

U.S. PATENT DOCUMENTS

2008/0215209 A1* 9/2008 Ikeda .................... B60R 25/255
701/36
2012/0275445 A1* 11/2012 Karlsson ............... H04W 12/06
370/338
(Continued)

FOREIGN PATENT DOCUMENTS

JP 2008-213634 A 9/2008
KR 2012-0067264 A 6/2012
(Continued)

OTHER PUBLICATIONS

International Search Report and Written Opinion for Int. App. No. PCT/KR2019/016453 completed Mar. 13, 2020.

*Primary Examiner* — Hirdepal Singh
(74) *Attorney, Agent, or Firm* — MCDONNELL BOEHNEN HULBERT & BERGHOFF LLP

(57) ABSTRACT

Disclosed herein a method for operating a moving object to which a plurality of identification devices. The method includes: recognizing, by the moving object, a first identification device and a second identification device; and processing data of the moving object based on the recognized first identification device and the recognized second identification device. The data is processed based on the first identification device, when the data is first-type data, and the (Continued)

data is processed based on the second identification device, when the data is second-type data.

18 Claims, 10 Drawing Sheets

(51) Int. Cl.
    *H04W 12/06*     (2021.01)
    *H04W 84/00*     (2009.01)
    *H04W 88/06*     (2009.01)

(58) Field of Classification Search
    USPC .......................................................... 455/411
    See application file for complete search history.

(56) References Cited

U.S. PATENT DOCUMENTS

| | | | | |
|---|---|---|---|---|
| 2019/0036948 A1* | 1/2019 | Appel | ................. | H04L 63/1441 |
| 2020/0143940 A1* | 5/2020 | Yasui | ....................... | G08G 1/00 |

FOREIGN PATENT DOCUMENTS

| | | |
|---|---|---|
| KR | 2013-0086363 A | 8/2013 |
| KR | 2017-0017947 A | 2/2017 |
| WO | 2012/061625 A2 | 5/2012 |
| WO | 2016/191064 A1 | 12/2016 |

\* cited by examiner

METHOD AND APPARATUS FOR USING MULTIPLE IDENTIFICATION DEVICES FOR MOVING OBJECT

CROSS REFERENCE TO RELATED APPLICATION

The present application is a U.S. National Phase Application pursuant to 35 U.S.C. § 371 of International Application No. PCT/KR2019/016453 filed Nov. 27, 2019, which claims priority to a Korean patent application No. 10-2019-0042877 filed on Apr. 12, 2019. The entire disclosure contents of these applications are herewith incorporated by reference into the present application.

BACKGROUND

Field of the Invention

The present invention relates to a method and apparatus for using a plurality of identification devices in a moving object.

Description of the Related Art

The subscriber identity module (SIM) is used for smart devices and smart phones. In addition, the universal subscriber identify module (USIM) technology may have evolved one step ahead of SIM in the global system for mobile communications (GSM), which is an advanced form of SIM card. Herein, USIM may be a tiny chip that is an essential component inserted in a 3G asynchronous wideband code division multiple access (WCDMA) terminal capable of video calls. Herein, USIM is composed of a micro-CPU and a memory. The CPU identifies a user through an encryption/decryption function, and the memory may be used as a storage space for an additional service and has a various form. Such a SIM card is applicable to a moving object, and this will be described below.

SUMMARY

The present invention may provide a method and apparatus for using a plurality of identification devices in a moving object.

The present invention may provide a method and apparatus for using different networks based on a plurality of identification devices in a moving object.

The present invention may provide a method and apparatus for recognizing different users based on a plurality of identification devices in a moving object.

According to the present disclosure, there is provided a method for operating a moving object to which a plurality of identification devices is applied, the method comprising: recognizing, by the moving object, a first identification device and a second identification device; and processing data of the moving object based on the recognized first identification device and the recognized second identification device. The data is processed based on the first identification device, when the data is first-type data, and the data is processed based on the second identification device, when the data is second-type data.

According to another embodiment of the present disclosure, there is provided moving object to which a plurality of identification devices is applied, the moving object comprising: a transceiver configured to transmit and receive a signal; and a processor configured to control the transceiver. The processor is further configured to: recognize the first identification device and the second identification device, and process data of the moving object based on the recognized first identification device and the recognized second identification device. When the data is first-type data, the data is processed based on the first identification device. When the data is second-type data, the data is processed based on the second identification device.

According to another embodiment of the present disclosure, there is provided a system, the system comprising: a moving object; and a plurality of identification devices. The moving object is configured to: recognize the first identification device and the second identification device, and process data of the moving object based on the recognized first identification device and the recognized second identification device. When the data is first-type data, the data is processed based on the first identification device. When the data is second-type data, the data is processed based on the second identification device.

In addition, the following matters may be commonly applied to the method for operating the moving object, a moving object, and a system.

According to the embodiment of the present disclosure, the first identification device and the second identification device may comprise specific identification information respectively.

According to the embodiment of the present disclosure, the specific identification information of the first identification device may be ID information of the moving object.

According to the embodiment of the present disclosure, the ID information of the moving object may have a fixed value.

According to the embodiment of the present disclosure, the specific identification information of the second identification device may be ID information of a user of the moving object.

According to the embodiment of the present disclosure, the specific identification information of the second identification device may be set as one of a plurality of user IDs.

According to the embodiment of the present disclosure, the moving object may perform identification and authentication for the user using the moving object. The specific identification information of the second identification device may be set as a user ID corresponding to the user, for whom the identification and the authentication are performed, among the plurality of user IDs.

According to the embodiment of the present disclosure, the moving object may change setting information of the moving object based on the second identification device, when the identification and the authentication are performed for the user.

According to the embodiment of the present disclosure, the setting information of the moving object may comprise at least one of a position of a driver's seat, a height of the driver's seat, a color of interior lighting, brightness of the interior lighting, a position of a room mirror, an angle of the room mirror, a position of a side-view mirror, an angle of the side-view mirror, an inside temperature, a steering wheel angle, a tire pressure, an autonomous driving setting parameter, a transmission setting mode, a dashboard mode, a navigation setting, a content setting, or a wireless communication linkage mode.

According to the embodiment of the present disclosure, the second identification device may store setting information for each user based on each user ID.

According to the embodiment of the present disclosure, the setting information of the moving object for the user may be updated based on the second identification device, when the identification and the authentication are performed for the user and the moving object is controlled by the user through the second identification device.

According to the embodiment of the present disclosure, the updated setting information of the moving object for the user may be stored in the second identification device.

According to the embodiment of the present disclosure, when the second identification device is installed in the moving object, identification and authentication may be completed for a user corresponding to the second identification device based on the specific identification information of the second identification device.

According to the embodiment of the present disclosure, the moving object may exchange a message for the user identification and authentication with at least one of the second identification device and a device of the user corresponding to the identification device, before the second identification device is installed. When the authentication is completed based on the message exchange, the second identification device may be installed in the moving object so that the identification and authentication for the user are completed.

According to the embodiment of the present disclosure, the first identification device may perform data exchange with an external device via a first network, and the second identification device may perform data exchange with an external device via a second network.

According to the embodiment of the present disclosure, the first network and the second network may be separated from each other.

According to the embodiment of the present disclosure, the first-type data may be data for an internal system of the moving object, and the second-type data may be data for an external system of the moving object.

According to the embodiment of the present disclosure, the data of the internal system may comprise data associated with at least one of security and safety of the moving object, and the data of the external system may comprise data associated with at least one of a convenient function and a service of the moving object.

According to the embodiment of the present disclosure, a data format of the first-type data may comprise at least one of an identification device type field, a moving object ID field, a target module indication field, or a data field.

According to the embodiment of the present disclosure, a data format of the second-type data may be set as a data format of a legacy communication network.

According to the embodiment of the present disclosure, the first identification device may be an embedded identification device, and the second identification device may be an installed identification device.

According to the embodiment of the present disclosure, two or more identification devices may be installed in the moving object.

According to the present invention, a method and apparatus for using a plurality of identification devices in a moving object may be provided.

According to the present invention, a method and apparatus for using different networks based on a plurality of identification devices in a moving object may be provided.

According to the present invention, a method and apparatus for recognizing different users based on a plurality of identification devices in a moving object may be provided.

The technical objects of the present invention are not limited to the above-mentioned technical objects, and other technical objects that are not mentioned will be clearly understood by those skilled in the art through the following descriptions.

DETAILED DESCRIPTION

Figure 1:
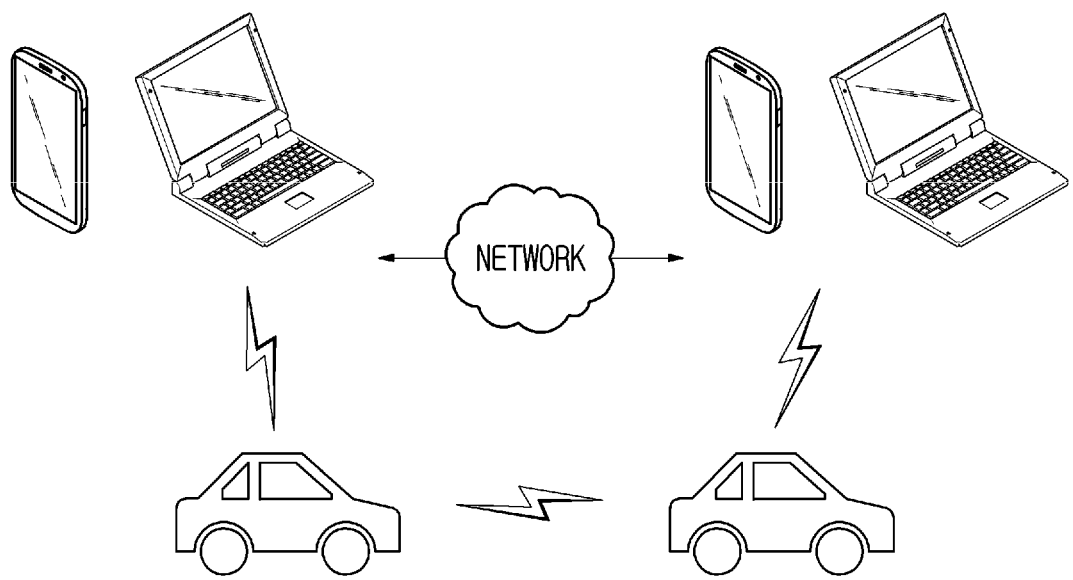
FIG. 1 is a view illustrating a method in which a moving object performs communication with other devices.

Hereinafter, exemplary embodiments of the present disclosure will be described in detail with reference to the accompanying drawings so that those skilled in the art may easily implement the present disclosure. However, the present disclosure may be implemented in various different ways, and is not limited to the embodiments described therein.

In describing exemplary embodiments of the present disclosure, well-known functions or constructions will not be described in detail since they may unnecessarily obscure the understanding of the present disclosure. The same constituent elements in the drawings are denoted by the same reference numerals, and a repeated description of the same elements will be omitted.

In the present disclosure, when an element is simply referred to as being "connected to", "coupled to" or "linked to" another element, this may mean that an element is "directly connected to", "directly coupled to" or "directly linked to" another element or is connected to, coupled to or linked to another element with the other element intervening therebetween. In addition, when an element "includes" or "has" another element, this means that one element may further include another element without excluding another component unless specifically stated otherwise.

In the present disclosure, the terms first, second, etc. are only used to distinguish one element from another and do not limit the order or the degree of importance between the elements unless specifically mentioned. Accordingly, a first element in an embodiment could be termed a second element in another embodiment, and, similarly, a second element in an embodiment could be termed a first element in another embodiment, without departing from the scope of the present disclosure.

In the present disclosure, elements that are distinguished from each other are for clearly describing each feature, and do not necessarily mean that the elements are separated. That is, a plurality of elements may be integrated in one hardware or software unit, or one element may be distributed and formed in a plurality of hardware or software units. Therefore, even if not mentioned otherwise, such integrated or distributed embodiments are included in the scope of the present disclosure.

In the present disclosure, elements described in various embodiments do not necessarily mean essential elements, and some of them may be optional elements. Therefore, an embodiment composed of a subset of elements described in an embodiment is also included in the scope of the present disclosure. In addition, embodiments including other elements in addition to the elements described in the various embodiments are also included in the scope of the present disclosure.

The advantages and features of the present invention and the way of attaining them will become apparent with reference to embodiments described below in detail in conjunction with the accompanying drawings. Embodiments, however, may be embodied in many different forms and should not be constructed as being limited to example embodiments set forth herein. Rather, these embodiments are provided so that this disclosure will be complete and will fully convey the scope of the invention to those skilled in the art.

Hereinafter, embodiments of the present disclosure will be described with reference to the accompanying drawings.

FIG. 1 is a view illustrating a method where a moving object communicates with another moving object or device via a network. Referring to FIG. 1, a moving object may communicate with another moving object or another device. Herein, as an example, the moving object may communicate with another moving object or another device based on cellular communication, WAVE communication, dedicated short range communication (DSRC), or other communication schemes. That is, as a cellular communication network, a communication network such as LTE, 5G, WiFi communication network, WAVE communication network, etc. may be used. In addition, a local area network used in a moving object, such as DSRC may be used, and the present disclosure is not limited to the above-described embodiment.

In addition, as an example, for the purpose of security of a moving object with respect to communication of the moving object, a module capable of communicating only with a device inside the moving object and a module capable of communicating with a device outside the moving object may exist separately. As an example, inside the moving object, communication based on the security such as Wi-Fi communication may be performed only for a device within a certain range in the moving object. As an example, the moving object and a personal device owned by the moving object driver may include a communication module for performing communication only with each other. That is, the moving object and the personal device of the moving object driver may use a communication network disconnected from an external communication network. Also, as an example, the moving object may include a communication module for performing communication with an external device. In addition, as an example, the above-described module may be implemented as a single module. In other words, based on a single module, a moving object may communicate with anther device, which is not limited to the above-described embodiment. That is, in a moving object, communication may be performed based on various methods and is not limited to the above-described embodiment.

Herein, as an example, a moving object may refer to a device capable of moving. As an example, a moving object may be a vehicle (including an autonomous vehicle or an automated vehicle), a drone, a mobility, a mobile office, a mobile hotel or a personal air vehicle (PAV). In addition, a moving object may be any other moving apparatus and is not limited to the above-described embodiment.

FIGS. 2A-2D are views illustrating a method of applying an identification device to a moving object.

As an example, the identification device may be a device having at least any one or more functions of identifying a user, a control target, and a service target. In addition, as an example, the identification device may be a device having an ID function. In addition, as an example, the identification device may be at least any one or more among a smart device, a smart module, a user identification module, and an identification module. That is, the identification device may be a hardware configuration. In addition, as an example, the identification device may be a software configuration used for the above-described identification. Herein, as an example, the identification device may be a subscriber identity module (SIM). As an example, an SIM, which is applied as an identification device to a moving object, may be at least one or more of a mobility SIM (M-SIM) and a vehicle SIM (V-SIM). In addition, as an example, the identification device may be a module that is the same as or compatible with an existing SIM, which is not limited to the above-described embodiment. Although the description below focuses on an identification device, the identification device may be replaced by a smart module, a user module, an SIM and the like, which is not limited to the above-described embodiment. However, for the convenience of explanation, the description below focuses on an identification device. As described above, an identification device may be applied to a moving object by considering such a case in which the moving object performs communication with an external device. As an example, a smart phone user may be recognized through a universal subscriber identity module (USIM) in the smart phone, and a service may be provided. As an example, when a device is compatible with a same brand or an identification device, a user of the device may be distinguished by changing only the user's identification device and a service may be provided based thereon. Based on what is described above, a moving object may also have an embedded identification device card. As an example, as an identification device applied to a moving object, a vehicle SIM may be referred to as VSIM. That is, as an identification device applied to a moving object, a new type of identification device may be applied. As an example, a VSIM may be compatible with a USIM or another SIM. In addition, a VSIM may provide another service by considering a characteristic of a moving object, which is not limited to the above-described embodiment. In addition, an identification device card applied to a moving object may be provided and be referred to by another name, which is not limited to the above-described embodiment.

Meanwhile, as an example, referring to FIG. 2, there may be a part in a moving object, to which an identification device is applicable. Herein, FIG. 2 is merely an example to which an identification device is applied, and the present invention is not limited to the above-described embodiment.

Figure 2A:
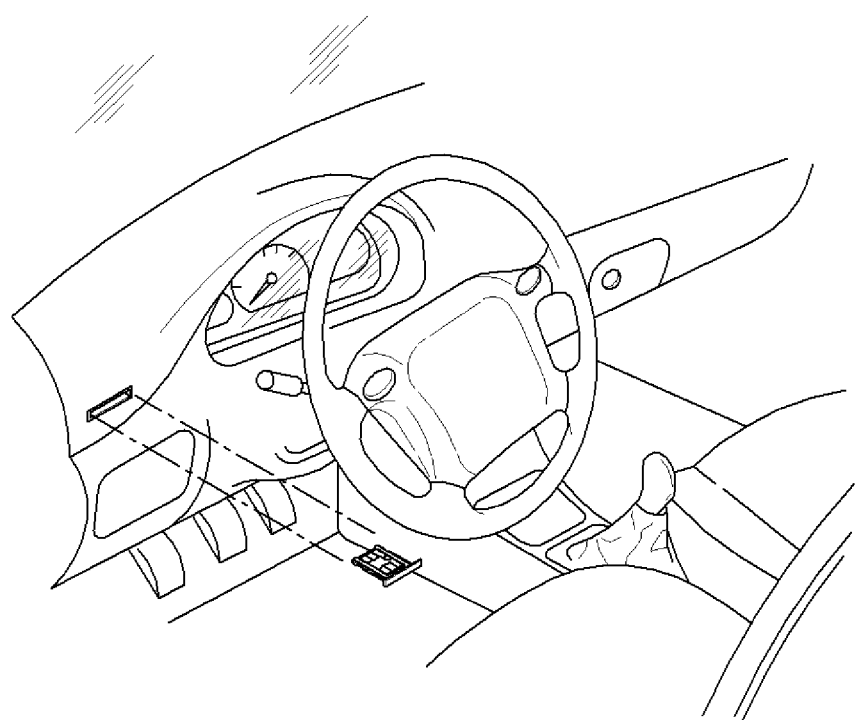
FIGS. 2A, 2B, 2C, and 2D are views illustrating a method of applying an identification device to a moving object.
Figure 2B:
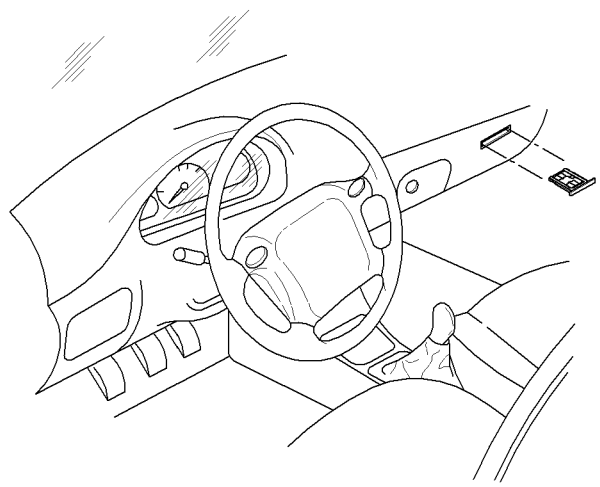

Specifically, as shown in FIG. 2A, a part for applying an identification device may exist in a position visually identifiable at the driver's seat of a moving object. As another example, as shown in FIG. 2B, an identification device may be applied inside the glove compartment of a passenger seat in a moving object. As another example, an identification device may be inserted into a part where a display of a moving object is present, which is not limited to the above-described embodiment.

Figure 2C:
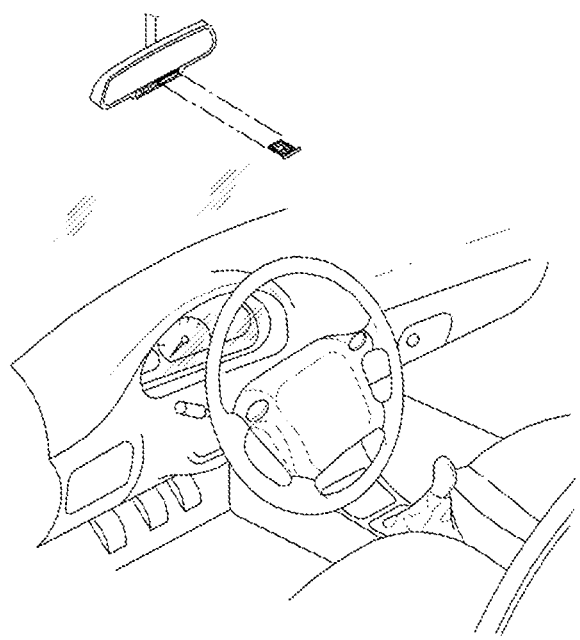
Figure 2D:
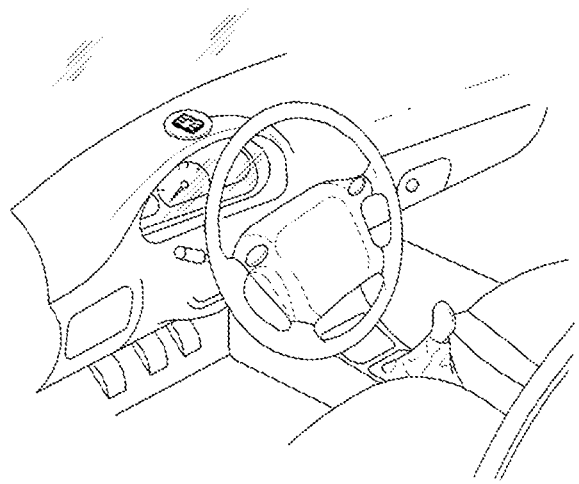

As another example, as shown in FIG. 2C, an identification device may be installed in a mirror in a moving object. For example, as a mirror in a moving object is very accessible to a passenger without affecting the operation or other apparatuses of the moving object, an identification device may be installed in the mirror in the moving object. As another example, as shown in FIG. 2D, an identification device may be installed in a cradle or a pad. For example, when a moving object is controlled by an identification device, the identification device may be frequently replaced according to users. In view of what is described above, an identification device may be installed in a cradle or a pad to enhance the convenience of installation and may be used to control a moving object based thereon. Meanwhile, as an example, a cradle or a pad may allow an identification device to be installed based on magnetism. In addition, as an example, an identification device may be installed in a cradle or a pad based on another method, which is not limited to the above-described embodiment.

As another example, in consideration of the portability of an identification device, the identification device may be embodied in a combined state with a tool key or a car key. That is, an identification device may be installed in a tool key or a car key, and the identification device may be removed from the car key and be used by being installed in a moving object. As an example, a USIM or another identification device with a similar form may have a small size. In addition, an identification device has a part contacting a moving object, and it is necessary to prevent the contact part from being damaged. In consideration of the above description, an identification device may be combined with a car key or a tool key. As another example, a car key or a tool key itself may be an identification device. That is, each user may possess his own car key or tool key as an identification device, based on which a moving object may be controlled. Meanwhile, as an example, when a car key or a tool key is an identification device, it is possible to consider a case in which the identification device is installed in a moving object. In addition, as an example, a car key or a tool key may communicate with a moving object via a local area network (e.g., Bluetooth, Beacon, NFC) and thus perform message exchange and identification. That is, a car key or a tool key reflecting the uniqueness of an individual may be used as an identification device, which is not limited to the above-described embodiment.

As another example, the above-described identification device may be installed through an existing device, which is installed in a moving object. For example, an existing device (e.g., Hi-Pass terminal, black box) may be installed in a moving object. Herein, in case a separate installation part is made in a moving object in order to install an identification device, as the equipment for the moving object should be modified and a configuration or components for additional installation may be required, the existing device may be used to install the identification device. That is, a configuration for installing the identification device may be added to the existing device that is already installed in a moving object, based on which the identification device may be installed. As another example, an identification device may be recognized through an existing terminal (e.g., USB port, cigar jack socket) included in a moving object.

As another example, an identification device may be applied to any position in a moving object within a range capable of authentication, and the identification device may be applied either as an integrated form or a separate form to a control unit, a communication unit or constitutional parts of the moving object.

Specifically, a moving object may include a separate installation unit for installing an identification device or a part in which the identification device is installed. That is, an identification device may be installed in a moving object as an independent part that is separate from other parts. As another example, as described above, an identification device may be installed in a moving object as a form included at least one of a control unit, a communication unit and another unit. As an example, in a moving object, a control unit or a communication unit may be a unit for communicating with an external device or for controlling information. Herein, an identification device may provide necessary information to the control unit or the communication unit or operate through identification and authentication. That is, as the identification device may be a device closely associated with the control unit or the communication unit, the identification device may be installed in a moving object by being combined with the units. That is, the identification device may be installed in the moving object as an integrated form with other units. As another example, an identification device may be embodied as an identification device embedded in a moving object. An embedded identification device may be embodied physically inside a moving object or be embodied as software in the operation and design processes of the moving object, which is not limited to the above-described embodiment.

In addition, as an example, a plurality of identification devices embodied in a moving object may all be embedded identification devices. Specifically, a plurality of identification devices may not be installed through a separate installation unit but may be embedded identification devices that are embodied either as hardware or as software in a moving object. As an example, a plurality of embedded identification devices may be identification devices that are embodied for each user. In addition, as an example, a plurality of embedded identification devices may be identification devices used for separating each system in a moving object, which is not limited to the above-described embodiment. That is, a plurality of identification devices may be embodied in a form of embedded identification devices in a moving object. In addition, a detailed operation based on the above description will be described below.

As an example, when equipment of a moving object is modified or an additional configuration is installed to install an identification device, a large expense may be required. In consideration of what is described above, an identification device may be installed (or recognized) through an existing terminal included in a moving object. Thus, an identification device may be easily applied to an existing moving object, which is not limited to the above-described embodiment.

Herein, when an identification device is applied to a moving object, the moving object may identify a subscriber based on the identification device. That is, similar to a smart phone, the moving object may also identify a moving object user based on the identification device. Herein, the identification device may include environment information according to the user like driving record information of the user, navigation setting information, moving object setting information, driver seat information and steering information. That is, by applying an identification device to a moving object, a system may be set up based on information on usage of the moving object. In addition, as an example, when an identification device is not applied to a moving object, the moving object may not operate. As an example, a moving object to which an identification device is applied may operate only when recognizing the identification device. However, as an example, driving may be possible in some cases where emergency or an urgent situation is considered.

Meanwhile, as an example, as described above, when an identification device in a moving object is not identified and authenticated, the control authority for the moving object may not be approved. As an example, in case a moving object is a vehicle, when the vehicle is turned on, the vehicle may be directly controlled, which is the traditional way. However, when an identification device is applied, the vehicle may be controlled only after the vehicle is turned and the identification and authentication for the identification device are completed. Specifically, a moving object may operate based on complete autonomous driving. In addition, as an example, a moving object may perform communication with other apparatuses via a communication network and operate based on information received through the communication. However, in the case of a moving object, as a plurality of operations and functions aimed for moving may be defined, a security problem and a risk of accident may exist when identification and authentication are not ensured. In consideration of what is described above, a moving object may be turned on in a way different from the traditional way and be controlled when identification and authentication are performed based on an identification device.

As another example, an identification device may operate irrespective of whether a moving object is turned on or not. As an example, apparatuses for supplying power to a block box and other existing apparatuses may be included in a moving object. Herein, an identification device may operate by receiving electric power from the moving object. As another example, an identification device may be an apparatus that operates by supplying power on its own. In addition, as an example, an identification device may be an apparatus that supplies power and operates based on a separate charger like a wireless charger or a solar charger. Herein, as the operation of the identification device may not be an operation consuming large power, the identification device may operate irrespective of whether a moving object is turned on or not. An identification device may be configured to operate not only by receiving power from a moving object but also by supplying power on its own. That is, an identification device may be a device capable of operating irrespective of whether a moving object is turned on or not, which is not limited to the above-described embodiment. Herein, as an example, even when the moving is not turned on, the identification device may perform the above-described identification and authentication. Meanwhile, as an example, in order to make an identification device triggered when a moving object is not turned on, identification and authentication may be performed when a personal device of the owner of the moving object is recognized. As another example, even when a moving object is not turned on, if it is recognized that a driver or another user is in the moving object, the operation of identification and authentication for an identification device may be performed, which is not limited to the above-described embodiment. That is, even when the moving object is not turned on, the identification device may operate, which is not limited to the above-described embodiment.

Herein, as an example, in consideration of what is described above, random removal of an identification device may be prevented in a moving object. Specifically, in the case of a moving object, as described above, there may be a high risk of security and accident. In addition, as described above, in the case of operation based on an identification device, when the identification device is removed at random, there may be a risk of accident based on authentication error. In consideration of the above description, random removal of an identification device may be prevented. As an example, an identification device may be installed and removed at random before a moving object is turned on. That is, when the moving object does not operate, the removal of the identification device may not be locked. Accordingly, a user who wants to use the moving object may change the identification device before the moving object is turned on and may use another identification device suitable for the user.

Figure 3A:
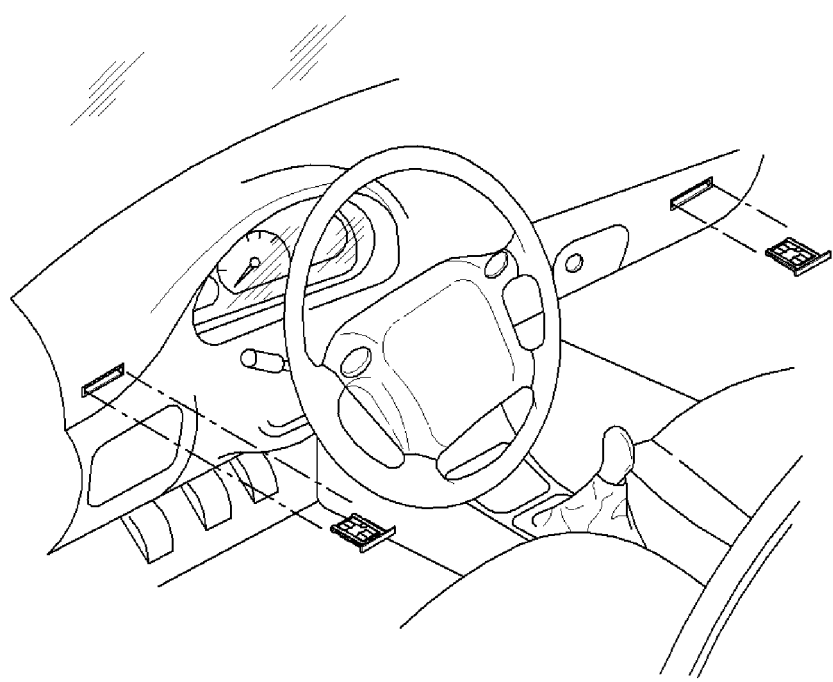
FIGS. 3A, 3B, and 3C are views illustrating a method of installing a plurality of identification devices in a moving object.
Figure 3B:
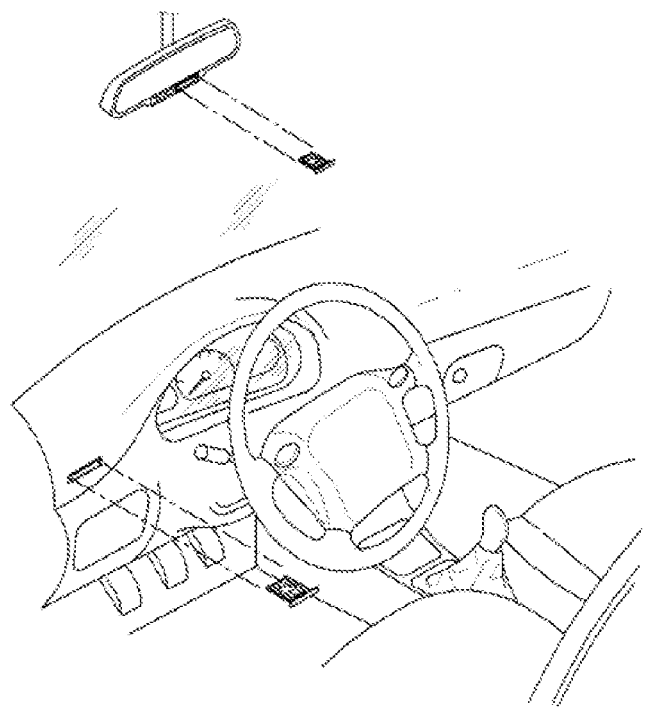
Figure 3C:
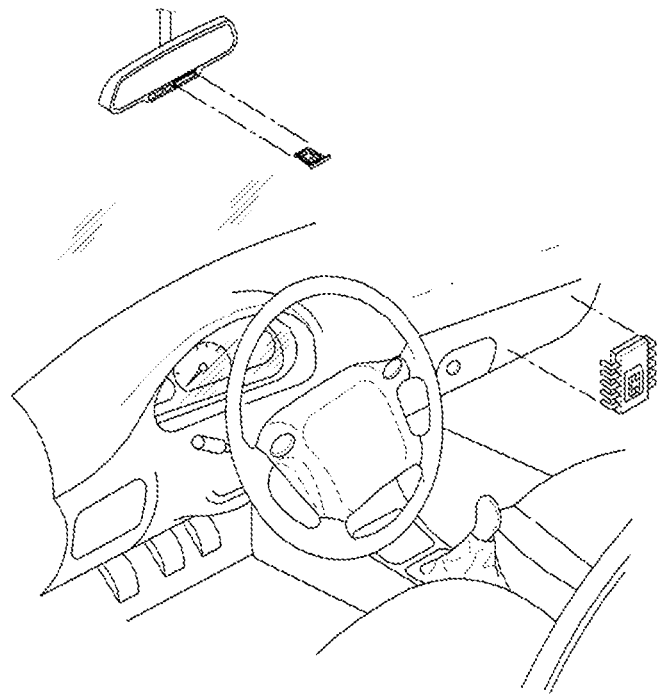

In addition, as an example, referring to FIGS. 3A-3C, a plurality of identification devices may be installed in a moving object. As an example, referring to FIG. 3A and FIG. 3B, a plurality of identification devices may be installed in a moving object based respective locations. Herein, as an example, the locations, in which the plurality of identification devices are installed, may be variously set, and installation locations are not limited to FIG. 3A and FIG. 3B described above. That is, a plurality of identification devices may be installed in a moving object and may perform individually identification and authentication, which will be described below.

In addition, as an example, like in FIG. 3C, some of a plurality of identification devices may be embedded identification devices, and some other may be installed identification devices. Herein, as an example, an embedded identification device may be embodied in a moving object either physically or as software. As an example, an embedded identification device may be the above-described embedded SIM. That is, an embedded identification device may be an identification device that is embodied inside a moving object, which is not limited to the above-described embodiment. When a plurality of identification devices is applied to a moving object, the identification devices may be installed or embodied in the moving object in various forms, which is not limited to the above-described embodiment.

Herein, as an example, each identification device may perform identification and authentication for each corresponding user. Specifically, unlike the existing smart devices, a moving object may be used by a plurality of users. Herein, since a moving object may have autonomous driving or user-specific functions, the moving object needs to be used by distinguishing each user. In consideration of the above description, a plurality of identification devices may be installed (or embodied) in a moving object. Thus, a moving object may recognize a plurality of users.

For a more concrete example, a moving object may be operated (or driven) with a plurality of identification devices being installed. As an example, as shown in FIG. 3, not only two identification devices but also a larger number of identification devices may be installed in a moving object. In addition, as an example, as many identification devices as the number of users using a moving object may be installed. Herein, in case initial setting is performed for a moving object, the number of users may be checked, and based on this, an identification device may be installed in the moving object. Meanwhile, as an example, while a moving object is being used, an identification device may be additionally installed and a user may be added. As described above, in a plurality of identification devices are installed based on a user using a moving object, it is possible to prevent the moving object from being used by an unauthorized user without permission or being robbed.

As another example, as described above, an autonomous driving function or a user-specific function may be set in a moving object. As an example, each user may prefer different settings of moving object. In addition, each user may use a moving object in different environments. Herein, in a current moving object, settings may need to be manually modified in order to reflect what is described above. In addition, as an example, the autonomous driving function may be differently set according to each user. As an example, based on a user's skill, autonomous driving may be set as a full autonomous driving mode or as a partial autonomous driving mode. In addition, as an example, an autonomous driving mode may be differently set based on a user's age or driving experience. That is, an autonomous driving mode may be differently set according to each user using a moving object, which is not limited to the above-described embodiment.

As described above, when a moving object is used by a plurality of users, as the moving object needs to be used by distinguishing each user, a plurality of identification devices may be installed.

Meanwhile, as an example, when a moving object is used, the moving object may perform identification and authentication for a user and may operate based on an identification device for the user. Herein, as an example, the user may be identified and authenticated through a camera included in the moving object. As another example, the user may be identified and authenticated based on fingerprint recognition or a separate authentication key. That is, when using a corresponding moving object, each user may be identified and authenticated through a fingerprint or a separate authentication key (e.g., password) that the user has already received. As another example, identification and authentication for a user may be performed through at least one or more among fingerprint recognition, iris recognition, face recognition, moving object head unit input, FOB key, electronic key, Internet advance reservation, another device, a server or a mobile device. That is, a moving object may be capable of identifying and authenticating each user, which is not limited to the above-described embodiment. In addition, as an example, when an identification device is installed, a moving object may identify and authenticate a user based on information stored in the identification device. That is, when an identification device is installed, a moving object may identify and authenticate a user corresponding to the identification device, without additional operation of identification and authentication, and may operate based on this.

Herein, as another example, in order to prevent an unauthenticated identification device from being installed in a moving object without permission, the installation operation for the identification device may be restricted. Specifically, a moving object may perform authentication based on wireless communication with a corresponding identification device or with a device of a user using the identification device. That is, authentication may be performed to permit an identification device to be installed before the identification device is installed, and thus the identification device may be prevented from being installed without permission. As an example, an installation unit for an identification device in a moving object may not be opened before authentication, and the installation unit for an identification device may be opened when installation is permitted through preliminary authentication with the identification device itself or a device of a user. Herein, the moving object may perform identification and authentication for the user only through the installation of the identification device and may operation based on this, which is not limited to the above-described embodiment.

Herein, when the moving object identifies and authenticates the user, the moving object may operate based on the identification device corresponding to the identified and authenticated user. As an example, a moving object may store and update information related to the use or driving of the moving object in a corresponding identification device based on a corresponding user. In addition, as an example, setting information for the user may be stored in the identification device. Herein, when the moving object recognizes the user, setting of the moving object may be changed based on the setting information included in the identification device.

Figure 4:
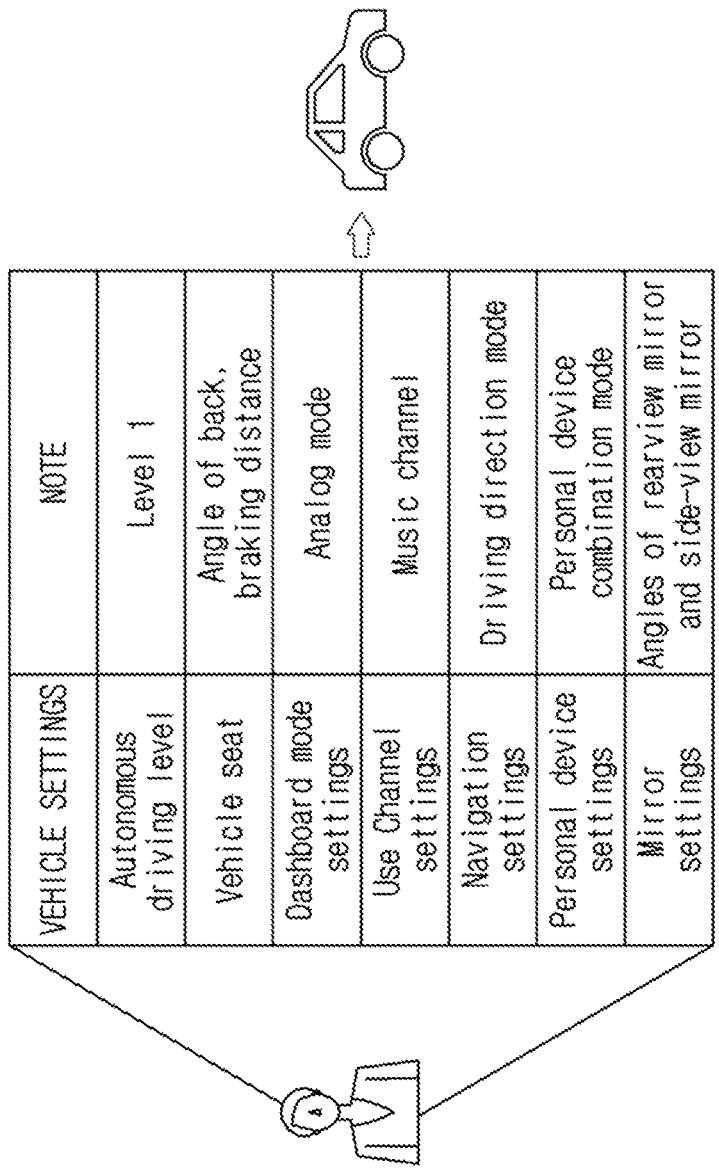
FIG. 4 is a view showing setting information for a user.

FIG. 4 is a view showing setting information of a moving object according to each user. Referring to FIG. 4, as described above, an identification device corresponding to each user may store at least one or more of information on each user's style and user information. Herein, as an example, an identification device may include, as personal style information, information on autonomous driving level information, vehicle seat, dashboard mode setting, channel, navigation setting, personal device setting and mirror setting. However, this is merely one example, and the present disclosure is not limited to the above-described embodiment. That is, an identification device may store a personal driving style or user-related information, and the setting of a moving object may be changed when the identification device is recognized. Thus, the setting of a moving object may be provided by being customized to each user using the moving object. That is, as in FIG. 4 described above, information set to each user may be provided based on an identification device. For a more concrete example, various driving environments such as the position and height of a driver's seat, the color and brightness of interior lighting, the positions and angles of a room mirror and a side-view mirror, inside temperature control (air conditioner and heater), a steering wheel angle, a tire pressure, a transmission setting mode (normal, eco, power, etc.), a wireless communication mode (WAVE, cellular, etc.), ranges of autonomous driving function parameters (velocity, distance between vehicles, land change velocity, acceleration, deceleration, etc.) may be provided after being adjusted to driving style set in a user's identification device.

Specifically, the setting for driving a moving object may vary according to each user, and when each user uses a moving object that does not match his/her own setting, an accident may be more likely to occur due to mishandling and the like. Accordingly, as a moving object applies setting for an individual user through an identification device, the convenience of using the moving object may be improved.

Figure 5:
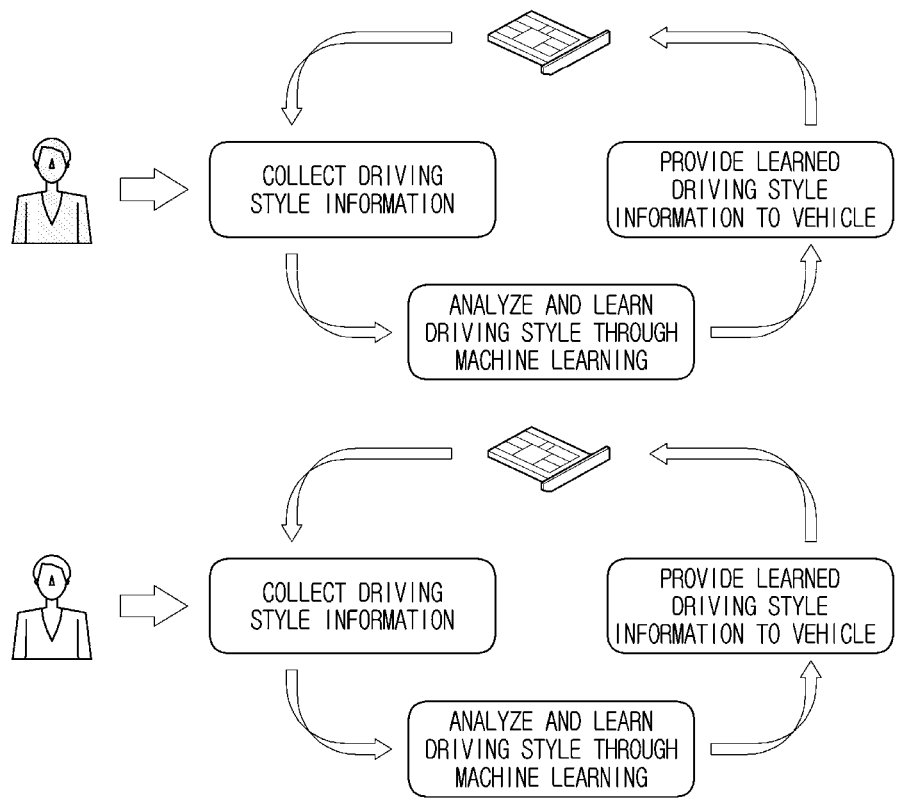
FIG. 5 is a view illustrating a method for updating user information based on a plurality of identification devices in a moving object.

FIG. 5 is a view illustrating a method in which an identification device updates user information. As another example, referring to FIG. 5, the above-described information may be information that is constantly learned based on machine learning. Specifically, based on FIG. 4, personal style or driver information may be information that is set by a user. However, the user may not know exactly the information in many cases. That is, the user may not confirm exactly the values and settings for the information. In this case, as an example, the user may adjust some of basic settings at the user's convenience based on driving style information, while using the moving object. In addition, the user may change the above-described settings by considering a specific situation or driving state while driving the moving object. Herein, the user may recognize the change but not exactly recognize the change by a numerical value or figure. In consideration of what is described above, an identification device may collect driving information or driving style information of a moving object user. Then, the identification device may continuously update setting information matching the user through machine learning. Herein, as described above, the moving object may be used by a plurality of users, and each user may have different driving information and driving style information. Accordingly, the moving object may recognize an identification device corresponding to each user and store information on each user in the identification device. Herein, the identification device may collect relevant information while a corresponding user is using the moving object, and the information may be updated through machine learning based on the above description. Thus, the user may have or utilize specific information for using the moving object, and the convenience of using the moving object may be improved based on the above description.

In addition, as an example, an identification device may transmit information stored and updated to another device of a corresponding user. That is, after performing identification and authentication for the identification device, the user may obtain his/her driving-related information stored in the identification device. Herein, the user may use the information when using another moving object. In addition, as an example, when changing a moving object or using a plurality of moving objects, the user may use information stored in a corresponding identification device, and the convenience of using a moving object may be improved accordingly.

Figure 6:
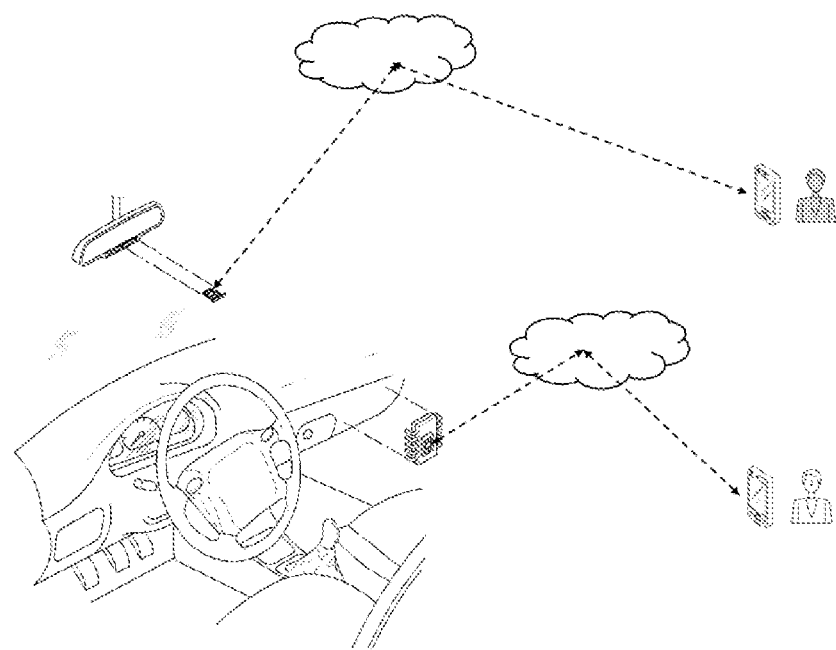
FIG. 6 is a view illustrating a method for using a plurality of networks based on a plurality of identification devices in a moving object.

FIG. 6 is a view illustrating a method for separating control authority based on a plurality of identification devices.

As another example, referring to FIG. 6, control authority for a moving object may be separated based on a plurality of identification devices. Specifically, a moving object may perform authentication for a user based on an identification device and thus may communicate with an external device. At this time, control authority for the moving object may be separated using the plurality of identification devices. As an example, control authority associated with the security and safety of a moving object needs to be given only to a specific user or manager. In consideration of what is described above, a specific identification device among a plurality of identification devices may store control authority associated with the security and safety of a moving object, and access may be permitted based on identification and authentication. On the other hand, authority for a convenient function or service of a moving object needs to be controlled by a user of the moving object. Herein, among a plurality of identification devices, an identification device for a user may store information on the convenient function or service, and a moving object user may have access based on identification and authentication. In consideration of what is described above, a plurality of identification devices may be installed (or embodied), and control authority may be separated based on each identification device. As an example, referring to FIG. 6, an embedded identification device embodied in a moving object may be used to modify information associated with the security or safety of the moving object or to communicate with an external device based on relevant information. Herein, the embedded identification device may be accessible only to an owner of the moving object or a specific person. That is, control authority and information associated with the security and safety of a moving object may be accessible only to a specific person based on an embedded identification device. As an example, authority or relevant information on a component inside a moving object may be controlled based on an embedded identification device. As an example, authority associated with the security and safety matters of a moving object, such as engine, transmission, anti-collision sensor, and airbag sensor may be controlled by an embedded identification device, which will be described below. In addition, as described above, as a plurality of identification devices may be installed in a moving object, an identification device associated with a convenient function or service may be additionally installed in the moving object. The identification device thus installed may control authority and information on a service of a moving object like communication between moving objects or communication between the moving object and another network. As an example, communication used by an embedded identification device and communication used by an installed identification device may be separated from each other. That is, each identification device may communicate with another device via each network and may control an operation of a moving object by storing authority and information permitted for the identification device. In addition, as an example, in the above description, an embedded identification device and an installed identification device may have different control authorities and may communicate with an external device via each network. However, an embedded identification device may be an identification device that is installed separately. That is, the above description may be applied to a plurality of installed identification devices, which is not limited to the above-described embodiment. In addition, as an example, the above-described operation may be performed based on a plurality of embedded identification devices, which is not limited to the above-described embodiment.

Figure 7:
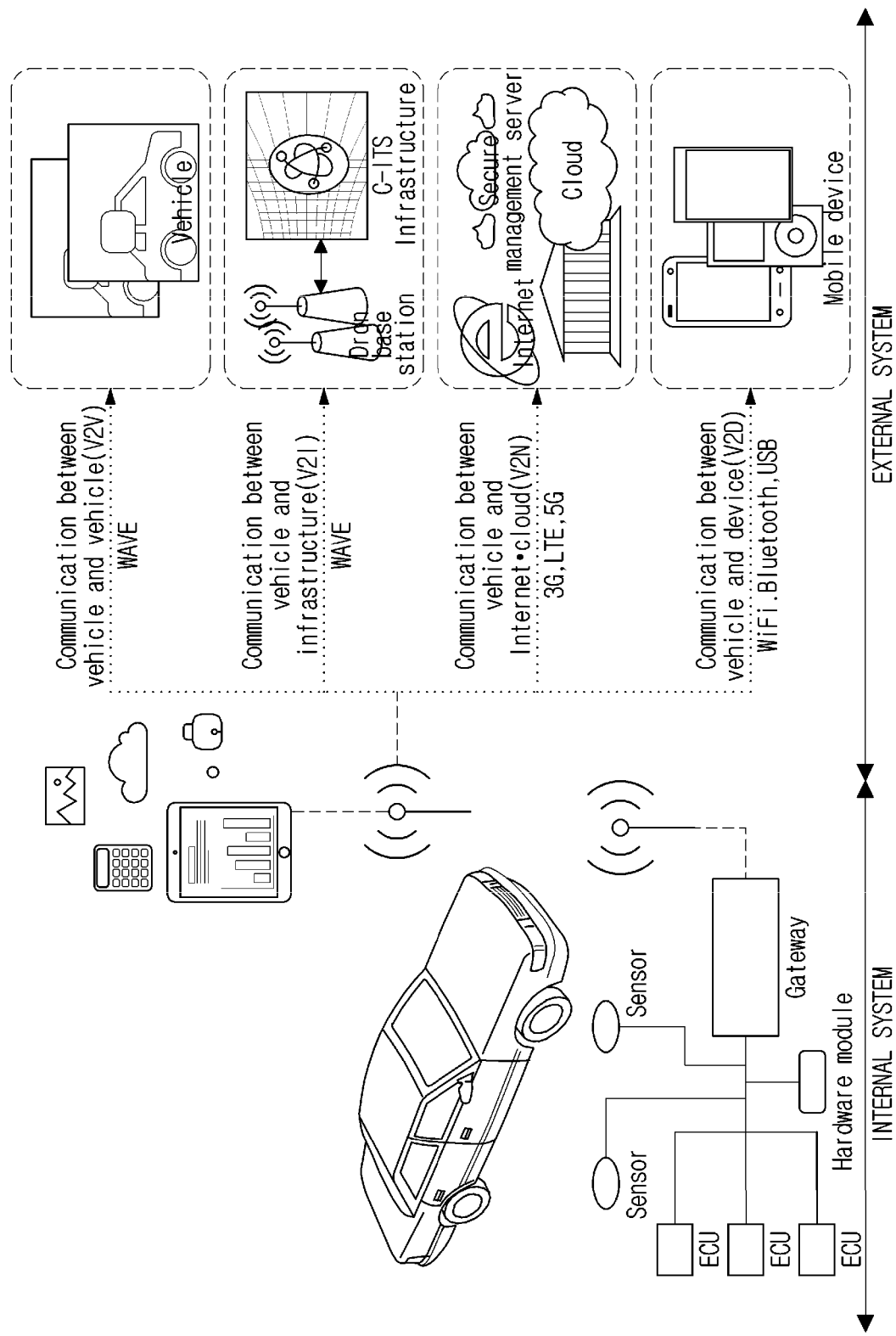
FIG. 7 is a view illustrating a method for separating an internal system and an external system based on a plurality of identification devices in a moving object.

FIG. 7 is a view illustrating a method in which a moving object is controlled based on a plurality of identification devices.

Referring to FIG. 7, at least one or more among an electronic control unit (ECU), a hardware module, a sensor and a gateway may be included inside a moving object. As a control unit embodied in a moving object, ECUs may exchange data between them. In addition, an ECU may exchange data with at least one or more among a hardware unit, a sensor and a gateway. In addition, a hardware module, which is a hardware configuration provided in a moving object, may exchange data for operating the moving object with other devices or modules. In addition, as an example, like a collision detection sensor or an airbag sensor, a sensor may be an apparatus configured to detect an external input and determine whether or not the external input is equal or greater than a threshold value. Herein, when the sensor detects an external input greater than the threshold value, the sensor may transmit input information to at least one or more among an ECU, a hardware module, and a gateway. In addition, a gateway may be a configuration for delivering information, which is obtained as described above, to other modules or apparatuses or an external device. Herein, as an example, the above-described apparatus (or configuration) may be a configuration included in an internal system of a moving object. That is, based on the above-described configurations, an internal system of a moving object may be operated. However, an internal system of a moving object may further include another configuration and is not limited to the above-described embodiment. Hereinafter, for the convenience of explanation, the above-described configuration will be referred to as an internal system. As an example, configurations included in an internal system may include a common protocol and packet for data exchange between the configurations. As an example, a control area network (CAN) packet can be conventionally used, and the configurations may operate based on the CAN packet. However, the present disclosure is not limited to the above-described embodiment, and a common protocol and packet for data exchange may be set in an internal system.

As an example, an identification device may perform identification and authentication for the above-described internal system. Specifically, data exchange may be needed not only between configurations in an internal system, as described above, but also with an external device. That is, a network may be needed for an internal system. Herein, the network may use a protocol or packet that may be used commonly, as described above. Accordingly, a dedicated network for an internal system may be required, for which an identification device may be used. Herein, as an example, the identification device may be an embedded identification device or an identification device that is used by being installed. The identification device used for the internal system may include identification information characteristic of a moving object. That is, the identification device may include ID information of the moving object. Herein, the moving object may communicate with another moving object or another apparatus by using the identification device. Herein, another moving object or another apparatus may use an identification device supporting a same type as an internal system. Based on what is described above, communication may be performed based on a same type of protocol or a same type of packet. As an example, configurations included in an internal system may process data or information directly related to the security or safety of a moving object. Accordingly, when access by an external network is permitted or another device has an easy access, a problem of security may occur. In consideration of what is described above, an internal system may communicate with another moving object or another device by using a dedicated network, and the above-described identification device may be used at this time.

In addition, as an example, a moving object may include not only an internal system but also an external system. Herein, as an example, an external system may be a system for control and information related to a moving object setting or a convenient function that is provided through a moving object. As an example, an external system may be a system in which information on a service provided through the configuration or moving object disclosed in FIG. 4 described above is controlled. That is, an external system may be a system defined with respect not to an internal operation of moving object but to user, which is not limited to the above-described embodiment. Herein, as an example, a moving object may include an identification device for an external system. Herein, the identification device may be an embedded identification device or an installed identification device, which is not limited to the above-described embodiment.

That is, a moving object may include an identification device for an internal system and an identification device for an external system. Herein, the identification device for the external system may also include separate identification information. That is, an identification device for an external system may also include ID information. However, as an example, an identification device for an external system may be ID information based on a user. Accordingly, as an example, ID information of an identification device for an internal system may be a fixed value as specific identification information of a moving object. On the other hand, ID information of an identification device for an external system may be a variable value as identification information for a user. As an example, as an identification device may be provided according to each user, when an identification device is uninstalled and another identification device is installed, ID information of identification device may be changed. In addition, as an example, an identification device for an external system may have multiple pieces of ID information corresponding to a plurality of users. Herein, the identification device may identify and authenticate a user using a moving object and may operate based on corresponding ID information. Herein, as an example, a method, in which a moving object identifies and authenticates a user, may be the same as described above. Thus, the moving object may recognize the user and may provide a service and a convenient function based on an identification device for an external system. That is, an external system may be a system that is defined based on a user.

Herein, as an example, referring to FIG. 7, an identification device for an external system may communicate with another moving object or another device by using an existing network. Herein, as an example, a moving object may communicate with another moving object or another device through an identification device for an external system via WAVE network. In addition, as an example, a moving object may communicate with another device through an identification device for an external system via at least one network among 3G, 4G and 5G. In addition, as an example, a moving object may perform communication through an identification device for an external system via Wifi, Bluetooth and NFC, which is not limited to the above-described embodiment. Herein, the moving object may receive information that is provided to a user through an identification device for an external system. As an example, a moving object may receive video information or voice information for a user through an identification device for an external system. Accordingly, an identification device for an external system may perform communication using a protocol or packet that is used in an existing communication network.

That is, a moving object may have identification devices for an internal system and an external system respectively. Herein, ID of an identification device for an internal system may be set and used as moving object-specific ID, and ID of an identification device for an external system may be set and used as user-specific ID. Based on what is described above, control authority and information may be separated and used in a moving object, and a mixture of networks may be controlled based on each identification device.

Figure 8:
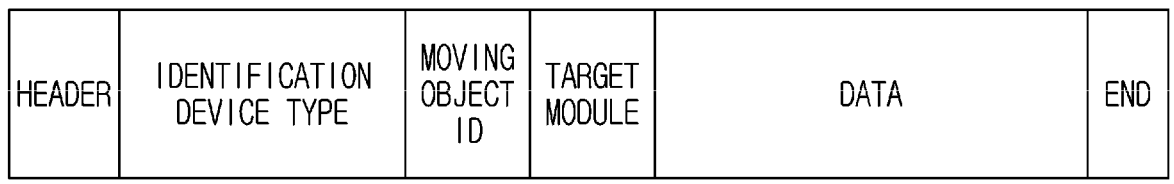
FIG. 8 is a view showing a data packet for an internal system of a moving object.

FIG. 8 is a view showing a format of data packet used in an internal system. In addition, as described above, an identification device for an external system may use a same protocol or packet as a protocol or packet used in an existing communication network in order to ensure compatibility with the existing communication network. On the other hand, a data format for an internal system may be newly defined based on an identification device.

Specifically, a data packet for an internal system may include a field indicating identification device type information. Herein, as an example, an identification device for an internal system may communicate with a same type of identification device via a network. As an example, the type of an identification device may be determined by each company or manager, which is not limited to the above-described embodiment. In addition, as an example, the type of an identification device may be determined according to the type of a moving object. As an example, as described above, a moving object may have various types like vehicle, PAV, shuttle and train. Herein, as an example, a moving object needs to be compatible with a moving object with same type. In consideration of what is described above, the type of an identification device may be determined according to the type of a moving object. That is, a same type of identification device may be used for a same type of moving object. Next, a data packet for an internal system of a moving object may include ID information of the moving object. Herein, as an example, ID information of a moving object may be ID information of an identification device. That is, as an identification device for an internal system stores ID information specific to a moving object, each moving object may be distinguished based on this. In addition, as an example, a data packet for an internal system may include a field for a target module (or configuration). As described above, various forms of modules or configurations may be included in an internal system. Herein, when communication is performed based on an identification device for an internal system, an identification device needs to check for which module or configuration of the internal system received information is information. For this, identification information for an internal system may include information distinguishing a target module. Herein, an identification device may compare the information with information including a target module field included in a data packet received from outside and thus may check for which module or configuration of an internal system the information is. In addition, a data packet may include a field for data. Herein, as an example, based on what is described above, data may be information for a specific module in a specific moving object of a target identification device. That is, an identification device for an internal system may perform data communication with another moving object or device through the above-described information. Herein, as an example, as described above, since an identification device is a dedicated identification device for an internal system, it may prevent invasion from an external network and may enhance security.

Figure 9:
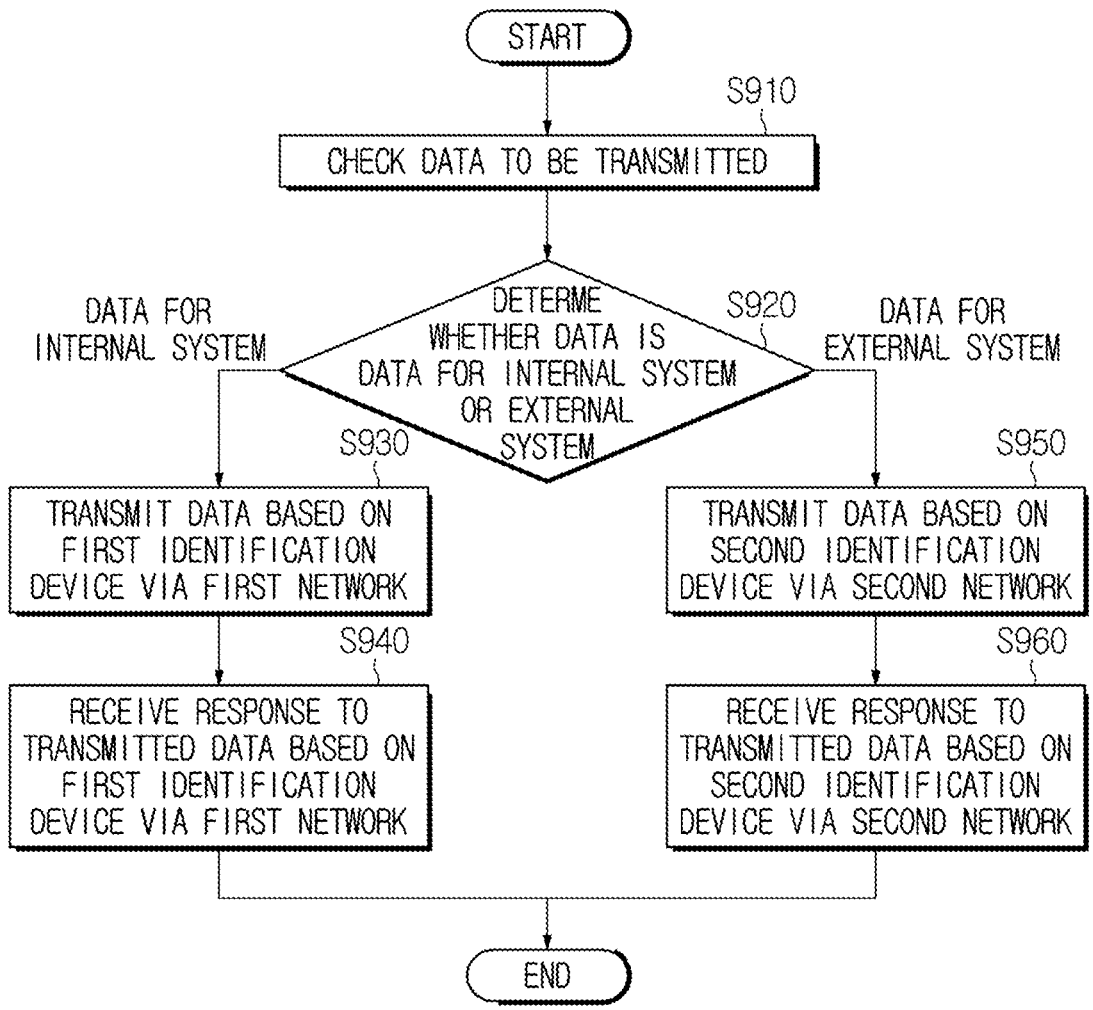
FIG. 9 is a view illustrating a method for performing data exchange based on a plurality of identification devices in a moving object.

FIG. 9 is a view illustrating a method in which a moving object transmits and receives data based on the present invention. Based on what is described above, a moving object may control authority and information via each network by using a plurality of identification devices. Specifically, referring to FIG. 9, a moving object may check data to be transmitted (S910). Alternatively, as an example, the moving object may check data to be received. Herein, the moving object may determine whether the data are data for an internal system or for an external system (S920). Herein, when the data are data for an internal system, the moving object may transmit the data based on a first identification device via a first network (S930). Herein, the first identification device may be an identification device for an internal system, as described above. Herein, the first identification device may be an embedded identification device or an installed identification device, which is not limited to the above-described embodiment. Herein, the first network may be a network that is authenticated through an identification device for an internal system. That is, the first network may be a network dedicated to the internal system. Herein, identification and authentication for the first network may be performed based on the first identification device, which is the same as described above. Next, the moving object may receive a response to the transmitted data based on the first identification device via the first network (S940). That is, the moving object may exchange information for an internal system with another moving object or device, which may be authenticated through the first identification device, as described above. Herein, the first identification device may include identification information specific to the moving object. As an example, in consideration of what is described above, the first identification device may be embodied as an embedded identification device, which is not limited to the above-described embodiment.

In addition, as an example, when the transmitted data are data for an external system, the moving object may transmit the data based on a second identification device via a second network at S950. Herein, the second identification device may perform identification and authentication for the second network for the external system. As an example, as described above, the second identification device may use a protocol or packet based on an existing network. That is, the second identification device may be an identification device compatible with the existing network and, based on this, may communicate with another moving object or an external device. Next, the moving object may receive a response to the transmitted data based on the second identification device via the second network at S960. Herein, as an example, as described above, the second identification device may include ID information for a user. That is, as the second identification device may be an identification device that is used based on a convenient function or service of the moving object, the second identification device may be a user-specific identification device. Thus, different convenient functions and services may be provided according to each user.

That is, by using a plurality of identification devices in a moving object, moving object-specific information and user-specific information may be distinguished and controlled, which is not limited to the above-described embodiment.

Figure 10:
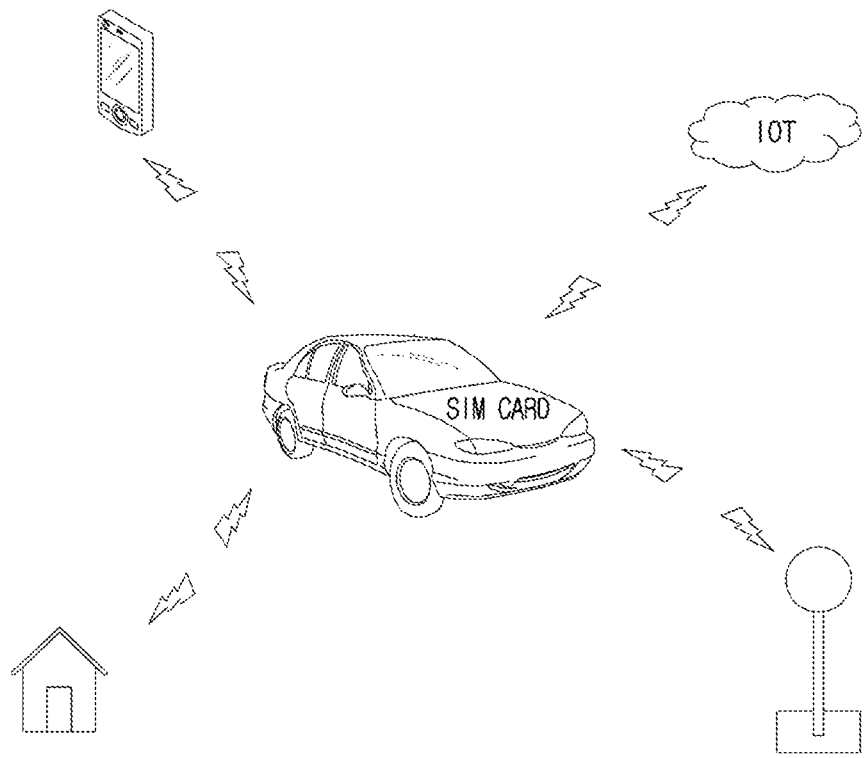
FIG. 10 is a view illustrating a method in which a moving object provides a service by performing communication with other apparatuses based on a plurality of identification devices.

FIG. 10 is a view illustrating a method in which a moving object performs communication with a plurality of devices. As an example, referring to FIG. 10, a moving object may communicate with another device through an identification device. As an example, the moving object may perform different device communications based on identification device types. Specifically, as described above, the moving object may include a plurality of identification devices. Herein, the moving object may have to perform data exchange with various devices via communication. However, in case the various devices do not operate via a same platform or a same communication network, the moving object may have to communicate with various types of devices. In addition, as an example, the moving object may communicate with other devices for different purposes. As an example, in case the moving object communicates with a road side unit (RSU) or an ITS infrastructure, the moving object may exchange data via WAVE communication or an existing communication network.

On the other hand, in the case of communication with IoT devices or devices located in a moving object, other communication networks need to be used. As an example, other communication networks may be used in consideration of interruption or disturbance on a communication network. In addition, as an example, different communication networks may be used by considering security or data separation, which is not limited to the above-described embodiment. In consideration of what is described above, the moving object may include a plurality of identification devices and may communicate with different devices through each identification device. Thus, the moving object may perform various types of communication and may enhance the convenience of user.

Figure 11:
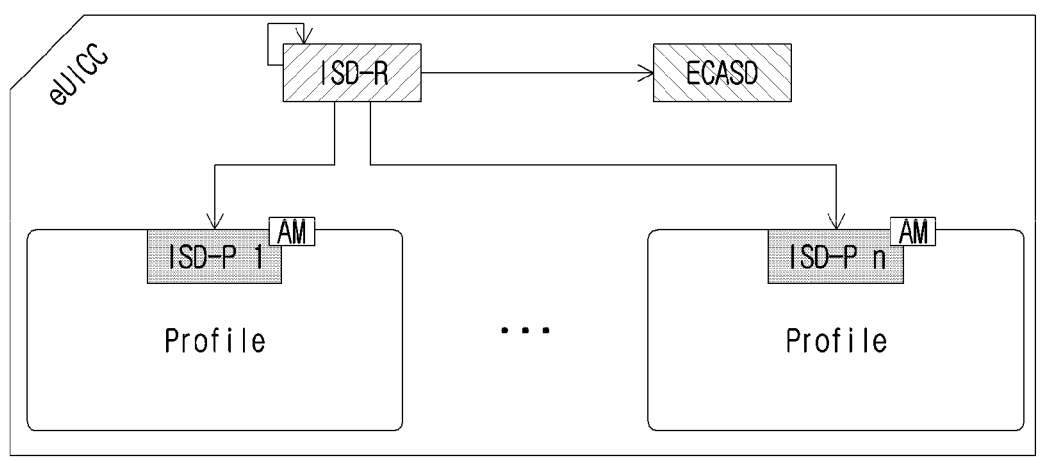
FIG. 11 is a view illustrating an embedded identification device.

FIG. 11 is a view illustrating a method in which a moving object operates based on an identification device. As an example, as described above, an embedded identification device or an identification device may store profile information as in FIG. 11. Herein, as an example, the profile information may be user-related information or information that is stored to use a moving object. Herein, as an example, considering the security of the moving object and the security of the identification device, a configuration capable of accessing the profile and a configuration for performing authentication with the moving object may be distinguished. That is, in an embedded identification device, a configuration capable of accessing the profile may obtain information on the control of the moving object from the profile and may transmit the information to a configuration capable of authentication with the moving object. In addition, as an example, the operation may be based on a different configuration from the configuration illustrated in FIG. 11, and the present invention is not limited to the above-described embodiment.

Figure 12:
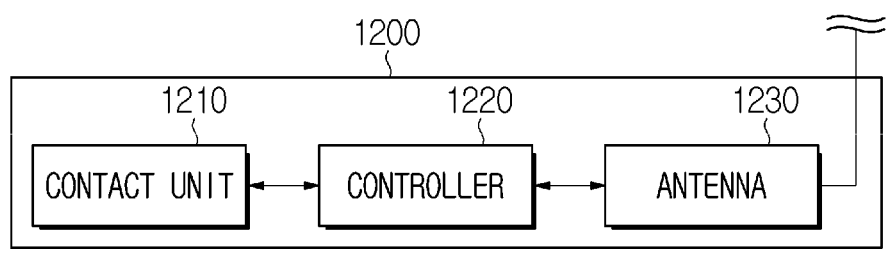
FIG. 12 is a view illustrating an apparatus configuration for an identification device.

FIG. 12 is a view illustrating an identification device. Referring to FIG. 12, an identification device 1200 may include a contact unit 1210 contacting a moving object or another device and enabling the moving object or another device to be recognized. In addition, as an example, the identification device 1200 may include a controller 1220 controlling and managing an operation based on the identification device 1200. In addition, the identification device 1200 may include an antenna 1230 that performs communication with another device and exchanges data. Herein, as an example, the controller 1220 may manage the contact unit 1210 and an antenna 1230 and may control other configurations. In addition, the configurations may be hardware configurations or software configurations. That is, the configurations may refer to configurations actually and physically included in the identification device 1200 or software configurations operating based on the operation and function of the identification device 1200. However, the present invention is not limited to the above-described embodiment.

Figure 13:
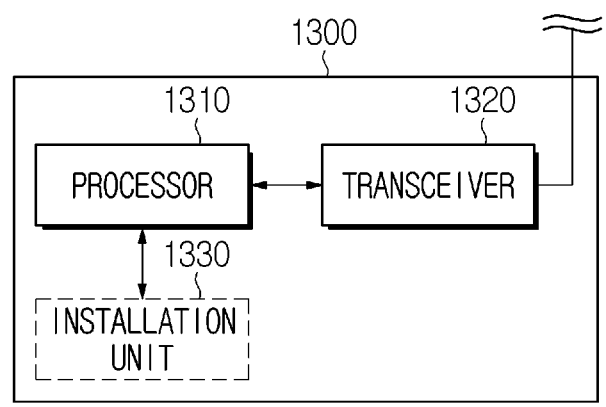
FIG. 13 is a view illustrating an apparatus configuration.

FIG. 13 is a view illustrating an apparatus configuration. Referring to FIG. 13, the apparatus may include at least one or more among the above-described moving object, a device, a server and an RSU. In other words, the apparatus may communicate and work with another device, which is not limited to the above-described embodiment. For example, for the above-described operation, an apparatus 1300 may include a processor 1310 and a transceiver 1320. That is, the apparatus may include a necessary configuration for communicating with another apparatus. In addition, as an example, the apparatus may include other configurations than the above-described configuration. That is, the apparatus may have a configuration, which includes the above-described apparatus for communicating with another device but is not limited thereto, and may be an apparatus operating based on what is described above.

In addition, as an example, the apparatus 1300 may further include an installation unit 1330 in which another device (e.g., identification device) is installed. Herein, the installation unit may be included in a moving object in the above-described forms of FIG. 2A to FIG. 2D. As an example, the installation unit 1330 may be embodied in any one region in front of a driver's seat in a moving object. In addition, as an example, the installation unit 1330 may be embodied in a passenger seat kit in a moving object. In addition, as an example, the installation unit 1330 may be embodied in a mirror in a moving object. In addition, as an example, the installation unit 1330 may be embodied in a form of cradle or paddle in a moving object, which is the same as described above. That is, as described above, the apparatus 1300 may further include the installation unit 1330 for recognizing an identification device as another device, based on which another device may be recognized and authentication may be performed. As an example, the installation unit 1330 may be embodied in a moving object. Herein, the installation unit 1330 may be embodied as a physical configuration inside the apparatus 1300. As another example, the installation unit 1330 may be embodied as a software configuration inside the apparatus 1300. Herein, when the installation unit 1330 is embodied inside the apparatus 1300, an identification device may also be embodied either as a physical configuration or a software configuration inside the apparatus 1300, as described above. The present invention is not limited to the above-described embodiment.

The present invention can be used to control a moving object using an identification device.

While the exemplary methods of the present disclosure described above are represented as a series of operations for clarity of description, it is not intended to limit the order in which the steps are performed, and the steps may be performed simultaneously or in different order as necessary. In order to implement the method according to the present disclosure, the described steps may further include other steps, may include remaining steps except for some of the steps, or may include other additional steps except for some of the steps.

The various embodiments of the present disclosure are not a list of all possible combinations and are intended to describe representative aspects of the present disclosure, and the matters described in the various embodiments may be applied independently or in combination of two or more.

In addition, various embodiments of the present disclosure may be implemented in hardware, firmware, software, or a combination thereof. In the case of implementing the present invention by hardware, the present disclosure can be implemented with application specific integrated circuits (ASICs), Digital signal processors (DSPs), digital signal processing devices (DSPDs), programmable logic devices (PLDs), field programmable gate arrays (FPGAs), general processors, controllers, microcontrollers, microprocessors, etc.

The scope of the disclosure includes software or machine-executable commands (e.g., an operating system, an application, firmware, a program, etc.) for enabling operations according to the methods of various embodiments to be executed on an apparatus or a computer, a non-transitory computer-readable medium having such software or commands stored thereon and executable on the apparatus or the computer.

What is claimed is:

1. A method for operating a moving object to which a plurality of identification devices is applied, the method comprising:
   recognizing, by the moving object, a first identification device and a second identification device; and
   processing data of the moving object based on the recognized first identification device and the recognized second identification device,
   wherein the data is processed based on the first identification device, when the data is first-type data, wherein the data is processed based on the second identification device, when the data is second-type data;
wherein the first-type data is data for an internal system of the moving object, and the second-type data is data for an external system of the moving object;
wherein the data of the internal system comprises data associated with at least one of security and safety of the moving object; and
wherein the data of the external system comprises data associated with at least one of a convenient function and a server of the moving object.

2. The method of claim 1, wherein the first identification device and the second identification device each comprise specific identification information.

3. The method of claim 2, wherein the specific identification information of the first identification device is ID information of the moving object.

4. The method of claim 3, wherein the ID information of the moving object has a fixed value.

5. The method of claim 2, wherein the specific identification information of the second identification device is ID information of a user of the moving object.

6. The method of claim 5, wherein the specific identification information of the second identification device is set as one of a plurality of user IDs.

7. The method of claim 6, wherein the moving object performs identification and authentication for the user using the moving object, and wherein the specific identification information of the second identification device is set as a user ID corresponding to the user for whom the identification and the authentication are performed, among the plurality of user IDs.

8. The method of claim 7, wherein the moving object changes setting information of the moving object based on the second identification device when the identification and the authentication are performed for the user.

9. The method of claim 8, wherein the setting information of the moving object comprises at least one of a position of a driver's seat, a height of the driver's seat, a color of interior lighting, brightness of the interior lighting, a position of a room mirror, an angle of the room mirror, a position of a side-view mirror, an angle of the side-view mirror, an inside temperature, a steering wheel angle, a tire pressure, an autonomous driving setting parameter, a transmission setting mode, a dashboard mode, a navigation setting, a content setting, or a wireless communication linkage mode.

10. The method of claim 8, wherein the second identification device stores setting information for each user based on each user ID.

11. The method of claim 8, wherein the setting information of the moving object for the user is updated based on the second identification device, when the identification and the authentication are performed for the user and the moving object is controlled by the user through the second identification device.

12. The method of claim 11, wherein the updated setting information of the moving object for the user is stored in the second identification device.

13. The method of claim 2, wherein, when the second identification device is installed in the moving object, identification and authentication are completed for a user corresponding to the second identification device based on the specific identification information of the second identification device.

14. The method of claim 13, wherein the moving object exchanges a message for the user identification and authentication with at least one of the second identification device and a device of the user corresponding to the identification device, before the second identification device is installed, and
wherein, when the authentication is completed based on the message exchange, the second identification device is installed in the moving object so that the identification and authentication for the user are completed.

15. The method of claim 1, wherein the first identification device performs data exchange with an external device via a first network, and
wherein the second identification device performs data exchange with an external device via a second network.

16. The method of claim 1, wherein a data format of the first-type data comprises at least one of an identification device type field, a moving object ID field, a target module indication field, or a data field.

17. A moving object to which a plurality of identification devices is applied, the moving object comprising:
a transceiver configured to transmit and receive a signal; and
a processor configured to control the transceiver;
wherein the processor is further configured to:
recognize a first identification device and a second identification device, and
process data of the moving object based on the recognized the first identification device and the recognized the second identification device;
wherein, when the data is first-type data, the data is processed based on the first identification device;
wherein, when the data is second-type data, the data is processed based on the second identification device;
wherein the first-type data is data for an internal system of the moving object, and the second-type data is data for an external system of the moving object;
wherein the data of the internal system comprises data associated with at least one of security and safety of the moving object; and
wherein the data of the external system comprises data associated with at least one of a convenient function and a server of the moving object.

18. A system comprising:
a moving object; and
a plurality of identification devices,
wherein the moving object is configured to:
recognize a first identification device and a second identification device; and
process data of the moving object based on the recognized first identification device and the recognized second identification device;
wherein, when the data is first-type data, the data is processed based on the first identification device;
wherein, when the data is second-type data, the data is processed based on the second identification device;
wherein the first-type data is data for an internal system of the moving object, and the second-type data is data for an external system of the moving object;
wherein the data of the internal system comprises data associated with at least one of security and safety of the moving object; and
wherein the data of the external system comprises data associated with at least one of a convenient function and a server of the moving object.

* * * * *